US009350806B2

(12) United States Patent
Kumar et al.

(10) Patent No.: US 9,350,806 B2
(45) Date of Patent: May 24, 2016

(54) ZERO COPY DATA TRANSFERS WITHOUT MODIFYING HOST SIDE PROTOCOL STACK PARAMETERS

(75) Inventors: Vikash Kumar, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 13/606,057

(22) Filed: Sep. 7, 2012

(65) Prior Publication Data

US 2014/0075007 A1    Mar. 13, 2014

(51) Int. Cl.
*H04L 12/26* (2006.01)
*H04L 29/08* (2006.01)
*H04L 12/54* (2013.01)
*H04L 29/06* (2006.01)

(52) U.S. Cl.
CPC .......... *H04L 67/1097* (2013.01); *H04L 12/26* (2013.01); *H04L 12/56* (2013.01); *H04L 69/16* (2013.01)

(58) Field of Classification Search
USPC .......................... 709/203, 223, 224, 227, 231
See application file for complete search history.

(56) References Cited

U.S. PATENT DOCUMENTS

| | | | |
|---|---|---|---|
| 6,601,207 B1 * | 7/2003 | Vanttinen | H04L 1/1614 714/748 |
| 2003/0172149 A1 | 9/2003 | Edsall et al. | |
| 2004/0062267 A1 * | 4/2004 | Minami et al. | 370/463 |
| 2006/0067222 A1 * | 3/2006 | Endoh | H04L 69/163 370/231 |
| 2006/0168286 A1 | 7/2006 | Makhervaks et al. | |
| 2007/0190947 A1 * | 8/2007 | Sakai | H04L 5/1438 455/67.14 |
| 2008/0059683 A1 * | 3/2008 | Sullivan et al. | 710/306 |
| 2009/0147796 A1 * | 6/2009 | Chow | 370/413 |
| 2010/0076744 A1 | 3/2010 | Gehr et al. | |
| 2010/0228934 A1 | 9/2010 | Chandrasekaran et al. | |
| 2011/0128853 A1 * | 6/2011 | Nishimura | H04L 47/10 370/235 |
| 2011/0166975 A1 * | 7/2011 | Williams | G06F 17/3051 705/35 |
| 2011/0302234 A1 * | 12/2011 | Monk | H04L 65/80 709/203 |
| 2012/0294213 A1 * | 11/2012 | Chen | H04L 5/001 370/311 |

FOREIGN PATENT DOCUMENTS

| | | |
|---|---|---|
| EP | 0 974 911 A2 | 1/2000 |
| EP | 1 843 345 A2 | 10/2007 |
| WO | WO 2008/049102 A2 | 4/2008 |

OTHER PUBLICATIONS

Ko, M. et al., "Internet Small Computer System Interface (iSCSI) Extensions for Remote Direct Memory Access (RDMA) (RFC5046)", ip.com, IPCOM000159874D, Oct. 1, 2007, 87 pages.

* cited by examiner

*Primary Examiner* — Barbara Burgess
(74) *Attorney, Agent, or Firm* — Stephen R. Tkacs; Stephen J. Walder, Jr.; Randall J. Bluestone

(57) ABSTRACT

Mechanisms are provided for instigating the sending of an acknowledgement response from a host system. A buffer of a data processing system is monitored to determine if there is a data transfer pending in the buffer. In response to a determination that there are no data transfers pending in the buffer, a determination is made as to whether there is an outstanding data transfer, on a corresponding network connection with the host system, for which an acknowledgement response has not been received from the host system. In response to a determination that there is an outstanding data transfer for which an acknowledgement response has not been received, an acknowledgement instigation message is sent to the host system to instigate the host system sending an acknowledgement response for the outstanding data transfer.

19 Claims, 4 Drawing Sheets

ZERO COPY DATA TRANSFERS WITHOUT MODIFYING HOST SIDE PROTOCOL STACK PARAMETERS

BACKGROUND

The present application relates generally to an improved data processing apparatus and method and more specifically to mechanisms for providing zero copy data transfers without modifying host side protocol stack parameters.

Internet Small Computer System Interface (iSCSI) is an Internet Protocol (IP)-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients (called initiators) to send SCSI commands, as command descriptor blocks (CDBs), to SCSI storage devices (targets) on remote servers. It is a storage area network (SAN) protocol, allowing organizations to consolidate storage into data center storage arrays while providing hosts (such as database and web servers) with the illusion of locally-attached disks.

Software implementations of the iSCSI protocol stack are layered on top of the Transmission Control Protocol (TCP)/IP implementation of the operating system within a storage controller. This means that each iSCSI packet is copied to TCP buffers before it can be transmitted over the network connection by the TCP/IP protocol stack. This copying to the TCP buffer for sending of the iSCSI packet over the network connection is done by the sendmsg( ) interface provided by the TCP. This copy operation is expensive in terms of processor utilization and thus, hinders full bandwidth and input/output processor utilization on high speed interconnects.

SUMMARY

In one illustrative embodiment, a method, in a data processing system, is provided for instigating the sending of an acknowledgement response from a host system. The method comprises monitoring a buffer of the data processing system to determine if there is a data transfer pending in the buffer. The method also comprises, in response to a determination that there is no data transfer pending in the buffer, determining whether there is an outstanding data transfer, on a corresponding network connection with the host system, for which an acknowledgement response has not been received from the host system. Furthermore, the method comprises, in response to a determination that there is an outstanding data transfer for which an acknowledgement response has not been received, sending an acknowledgement instigation message to the host system to instigate the host system sending an acknowledgement response for the outstanding data transfer.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
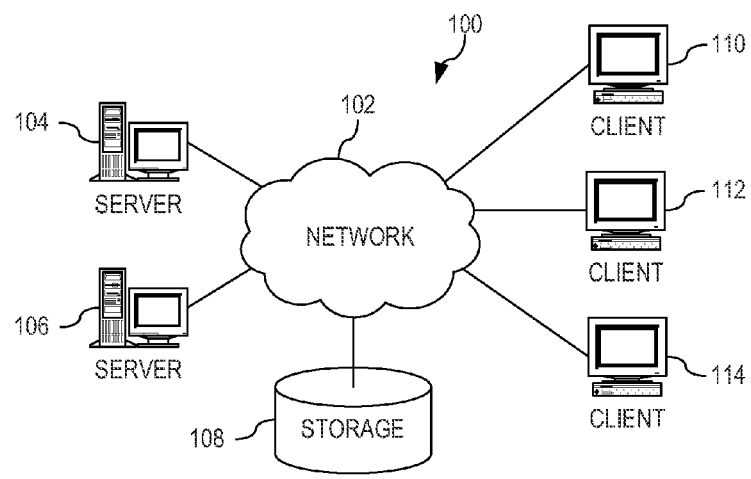
FIG. 1 is an example diagram of a distributed data processing system in which aspects of the illustrative embodiments may be implemented.

The illustrative embodiments provide mechanisms for providing zero copy data transfers without modifying host side protocol stack parameters. To be more specific, in some illustrative embodiments, the mechanisms achieve zero copy data transfers for software-based Internet Small Computer System Interface (iSCSI) implementations for high bandwidth links without modifying host side Transmission Control Protocol (TCP)/Internet Protocol (IP) parameters.

As mentioned above, known software-based iSCSI implementations are layered on top of TCP/IP and as a result, copying of iSCSI packets to TCP buffers is required to send the iSCSI packets across the network connection to the target. This is inefficient and expensive with regard to processor utilization. Hence, iSCSI storage controllers running a software iSCSI implementation, having an iSCSI driver, require a mechanism to avoid a copy operation for every iSCSI packet from the iSCSI driver to the TCP buffers.

In order to address this issue, a mechanism may be provided to allow iSCSI buffers to be directly used by the TCP layers without involving a copy operation into the TCP layer's internal buffers. An example of this interface is the sendpage( ) interface of the TCP. Upon completion of a Direct Memory Access (DMA) operation, and receipt of an acknowledgement from the target host system, the TCP layer calls back the iSCSI driver on the iSCSI storage controller to notify it that the send operation completed. Once this notification is received by the iSCSI driver, the iSCSI driver can then reuse the iSCSI input/output (I/O) buffers for the next iSCSI data packet transfer. Thus, such an implementation requires that the iSCSI driver I/O buffers be held, i.e. not reused, until the transfer of the iSCSI data packet is completed by the TCP layer, i.e. an acknowledgement (ACK) for each iSCSI data packet has been received from the target host system.

Host system implementations of the TCP/IP stack use an optimization referred to as a "delayed acknowledgement" or "delayed ACK." By setting a delayed ACK setting, the TCP layer optimizes ACK packets by not sending ACKs for every TCP frame (or data packet) received. Instead, an ACK is sent for every alternate TCP frame (or data packet) received.

That is, TCP is a data transport protocol which guarantees delivery of TCP data packets (or frames) by enforcing that every packet is acknowledged by the receiver (or target) computing device. This acknowledgement may be delayed by enabling the TCP delayed ACK setting in TCP to reduce the overhead of acknowledgements. The TCP delayed ACK setting dictates that the host system send an ACK packet, or frame, after at least two TCP packets/frames are received, thus reducing the total number of ACKs required. With such an optimization, if a single data packet is received by a receiver (or target) host system since sending a last ACK packet, the host system will wait for any of the following before sending the ACK response packet/frame back to the initiator, or sender, host system: another TCP packet/frame is received by the receiver (or target) host system; the receiver host system has a TCP data packet to send to the sender host system and thus, can piggyback the TCP data packet on an ACK packet; or a delayed ACK timeout condition is met (e.g., 40 ms to 500 ms).

The delayed ACK optimization of the TCP/IP stack has been observed to cause a severe performance problem intermittently for software iSCSI implementations on iSCSI storage controllers because the iSCSI driver of the iSCSI storage controller does not receive the sendpage( ) callback (indicating completion of an iSCSI command) until an ACK has been received for all sent iSCSI packets within the setting of the delayed ACK parameter. Currently, since host systems may delay up to approximately 500 ms to send an ACK when delayed ACK is enabled, input/output (I/O) latency may increase significantly and performance degradation may be observed.

The TCP delayed ACK optimization can be disabled manually on host systems to address the problems introduced by the use of the delayed ACK optimization. However, disabling TCP delayed ACK optimizations can have the following problems. First, the delayed ACK setting is implemented differently on each operating system and on some operating systems there is no support to disable the delayed ACK manually at ail. Second, the delayed ACK settings must be enabled/disabled on each and every host systems that is using a particular iSCSI storage controller of a storage system. These issues cause great administrative difficulty.

In addition, the delayed ACK setting benefits certain applications by optimizing the number of ACK packets transmitted. Thus, when the same TCP port on a host system is shared for iSCSI transfers and other applications, disabling the delayed ACK optimization can adversely affect the other applications' performance through the TCP port, even though the iSCSI I/O operations will benefit from the disabling.

Another problem with disabling TCP delayed ACK optimizations is that some host systems do not allow the administrator to change the delayed ACK setting. Thus, for those host systems, disabling the delayed ACK optimization is not an option.

Furthermore, there can be multiple network adapters on the host system. Disabling the delayed ACK optimization of each of these network adapters individually can be a cumbersome and error prone process.

Moreover, in some operating systems, the use of the delayed ACK optimization setting is applied system-wide, i.e. applicable to all network ports and network addresses. Hence selectively disabling the delayed ACK optimization for iSCSI ports is not an option for these types of operating systems.

The illustrative embodiments described herein provide mechanisms to use, for example, the sendpage( ) interface by a software based iSCSI storage controller implementation, without requiring any host system side settings to disable the delayed ACK optimization. With the mechanisms of the illustrative embodiments, the benefits of zero copy TCP transfers are achieved while at the same time overcoming the administrative issues that can be caused by requiring special settings on the host system side to disable the delayed ACK optimization.

With the mechanisms of the illustrative embodiments, iSCSI "keep alive" requests, e.g., NOP IN requests, are initiated by the iSCSI storage controller in situations when there are no additional iSCSI data packets to be sent over the network connection and an iSCSI data packet transfer is waiting for an ACK to complete a previous transfer. Sending the NOP IN request, for example, is a gentle nudge to the receiver (target) host system to send an ACK for the previous iSCSI packet received by it along with the ACK for the current packet.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
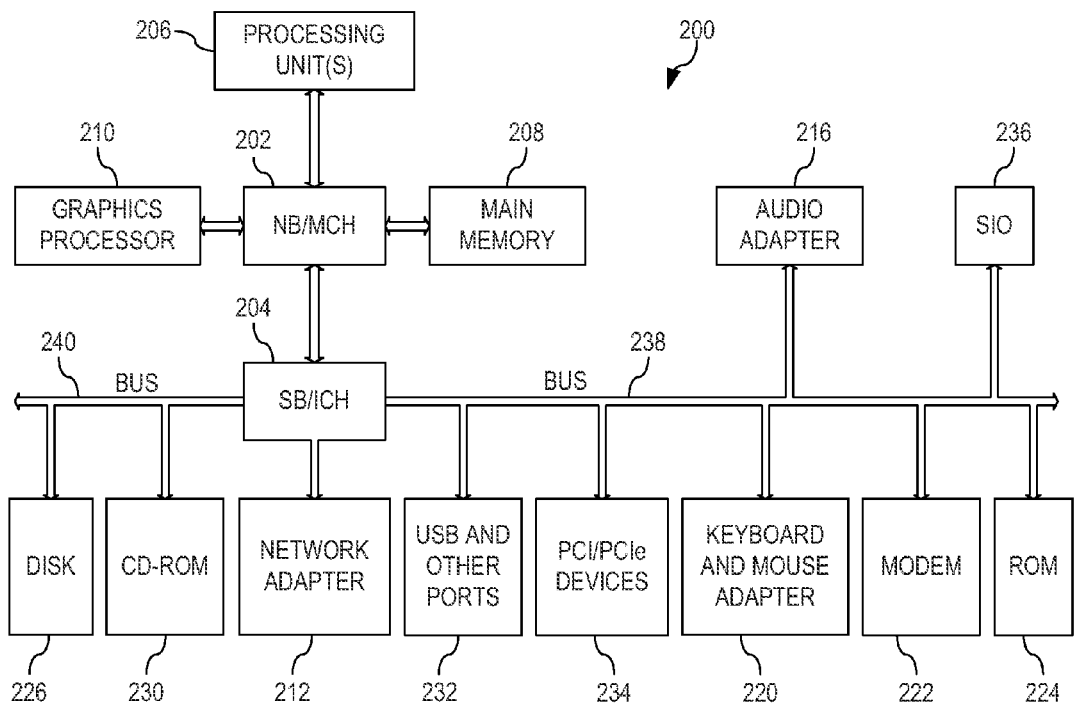
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage system 108. In accordance with the illustrative embodiments set forth herein, the storage system 108 may comprise a host system 120 that may be a target of data transfer commands from other computing devices connected to the network 102, e.g., server 104, 106 and/or clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, in accordance with the illustrative embodiments, one or more of the computing devices coupled to the network 102, e.g., servers 104, 106, and/or clients 110, 112, or 114, hereafter referred to as an originating host system, may be equipped with a network adapter for communicating or transferring storage system commands over the network 102 to a remotely located storage system, such as storage system 108 in FIG. 1, which may have an associated storage system controller, such as an iSCSI storage controller. The storage system controller of the storage system 108 may receive such storage system commands via the network 102 and perform the input/output (I/O) operations corresponding to the particular storage system command received, which may include transmitting data back to the originating host system in the case of READ storage system command. In response, the originating host system may respond to the receipt of data packets from the storage system controller with an acknowledgement packet, or ACK packet, which is transmitted via the network 102 back to the storage system controller of the storage system 108.

As discussed above, one optimization that may be implemented by such a host system, e.g., server 104, in its network protocol stack, e.g., TCP/IP stack, is a delayed ACK optimization that allows the host system to reduce the number of ACK packet transmissions that the host system sends by sending an ACK packet only after a predetermined number of packets/frames are received from the storage system 108, the host system has a data packet to send back to the storage system 108 and thus, the ACK packet can be piggy-backed on such a data packet, or if a predetermined amount of time has elapsed since the last ACK packet was sent, i.e. a timeout condition of the delayed ACK optimization has been reached.

With the mechanisms of the illustrative embodiments, the storage system controller of the storage system 108 is modified to implement delayed ACK instigation logic, which may be implemented in software executed on hardware, hardware only, or a combination of software and hardware elements. The delayed ACK instigation logic operates to determine if a "keep alive" message should be sent to the originating host system to instigate the sending of a delayed ACK packet response back to storage system controller of the storage system 108. For example, the delayed ACK instigation logic of the storage system controller of the storage system may determine if there are no additional outgoing data packets to be sent over the network connection to the host system in the storage system controller's buffer for the network connection. Moreover, the storage system controller may determine if it is currently waiting for an ACK response packet from the host system in order to complete a previous transfer of a data packet to the host system. If these conditions are met, then a "keep alive" message may be transmitted from the storage system controller of the storage system 108 over the network connection to the originating host system to prod, or otherwise instigate, the transmission of a delayed ACK response packet back to the storage system controller for the previous packet transmission and the current packet transmission from the storage system controller to the originating host system.

With the mechanisms of the illustrative embodiments, the storage system controller continues to derive the benefits of zero copy transfers for storage system commands from host systems, thereby ensuring high input/output processes (IOPs) and bandwidth utilization, while avoiding the problems that might otherwise be created by delayed ACK optimizations. The illustrative embodiments allow such benefits to be obtained without having to disable the delayed ACK optimizations on host systems thereby reducing administrative overhead. Moreover, the mechanisms of the illustrative embodiments permit the utilization of software implemented storage system controllers without the need for expensive offload engine hardware.

Figure 3:
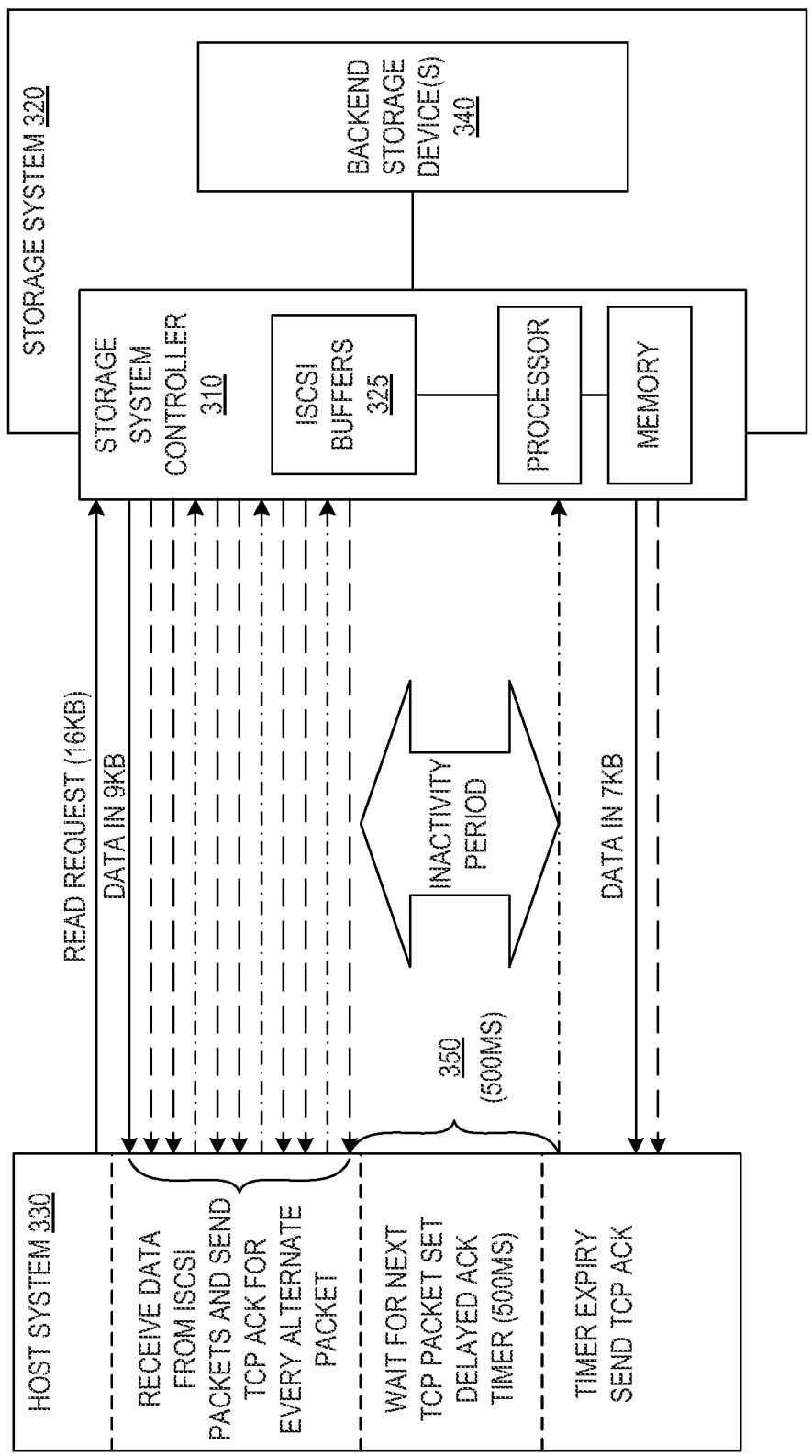
FIG. 3 is an example block diagram of an embodiment of a storage controller utilizing a delayed ACK optimization.

To better understand the improvements made by the mechanisms of the illustrative embodiments, it is first beneficial to consider an embodiment of a storage controller utilizing a delayed ACK optimization. FIG. 3 is an example block diagram of an embodiment of a host system utilizing a delayed ACK optimization with a storage system controller of a remotely located network attached storage system. For depiction purposes, the network between the storage controller 310 on a network attached storage system 320 and the remotely located host system 330, as well as the network adapters and other infrastructure components generally known in the art, are not explicitly shown in the figure. However, such elements, as well as other infrastructure components generally known in the art, are considered to be present where applicable and necessary for proper functioning of the system.

As shown in FIG. 3, a host system 330 may initiate a data transfer from a remotely located network attached storage system 320 by sending a Read request data packet to the storage system controller 310 over a network connection established between the host system 330 and storage system controller 310 in a manner generally known in the art. It is assumed for purposes of this description that the storage system controller 310 implements an iSCSI protocol thereby communicating with the host system 330 using TCP/IP packet based communications. Furthermore, the host system 320 is configured to utilize the delayed ACK optimization of the TCP/IP stack.

Thus, in response to the host system 330 sending a Read request message via data packet transmission to the storage system 320, the storage system 320 retrieves the requested data from backend storage devices 340 and stores the data into its iSCSI buffers 325. The storage system controller 310 then uses the sendpage( ) TCP interface to send the requested data directly from the iSCSI buffers 325 without having to first copy the data to TCP buffers. The data packets are then routed through the network (not shown) to the originating host system 330.

Meanwhile, the storage system controller 310 waits for a callback from the TCP layer to ensure that the iSCSI buffers 325 whose data packet is provided to the sendpage( ) TCP interface can be reused for a next data packet transmission. Such a TCP layer callback is received in response to the TCP layer of the storage system controller 310 receiving an ACK response data packet from the host system 330. However, due to the use of the delayed ACK optimization, the ACK response data packet is only sent after every predetermined number, greater than one, of data packets are received at the host system 330. Thus, for example, an ACK response data packet is sent after every second data packet is received.

In the depicted example, the host system 330 transmits a read request to the storage system controller 310 for 16 KB of data from the backend storage devices 340. The requested data may then be placed into the iSCSI buffers 325 of the storage system controller 310 which uses the sendpages( ) TCP interface to send 9 KB iSCSI data packets to the host system 330 via an iSCSI network connection with the host system 330. The 9 KB iSCSI data packet translates into 7 TCP/IP data packets that are actually transmitted from the storage controller 310 to the host system 330. The host system 330 is configured to receive these iSCSI packets and send a TCP ACK data packet for every alternate data packet. Thus, for a 9 KB iSCSI data packet, there will be 3 pairs of TCP data packets sent that will result in 3 ACK data packets being returned back to the storage system controller with the final TCP data packet being sent and the host system waiting for an additional data packet to be received before sending the ACK data packet response, a timeout condition, or a condition where the host system is sending a data packet to the storage system controller which can piggyback on the ACK response.

Thus, at some point during the transfer of data, a single TCP packet is sent from the storage system controller 310 to the host system 330 since a last TCP ACK was transmitted by the host system 330 to the storage system controller 310. In such a case, the host system 330 waits for the next TCP data packet from the storage system controller 310 which is itself waiting for a TCP ACK response from the host system 330. This results in a period of inactivity 350 in which no data packets are exchanged between the storage system controller 310 and the host system 330. Eventually a timeout condition of the delayed ACK optimization is met, e.g., 500 ms passing since a last ACK was transmitted from the host system 330. In response to this timeout condition being met, the TCP ACK is transmitted by the host system 330 to the storage system controller 310. As a result, the storage system controller 310 can reuse the iSCSI buffers 325 for a next portion of data to be transmitted to the host system 330.

Figure 4:
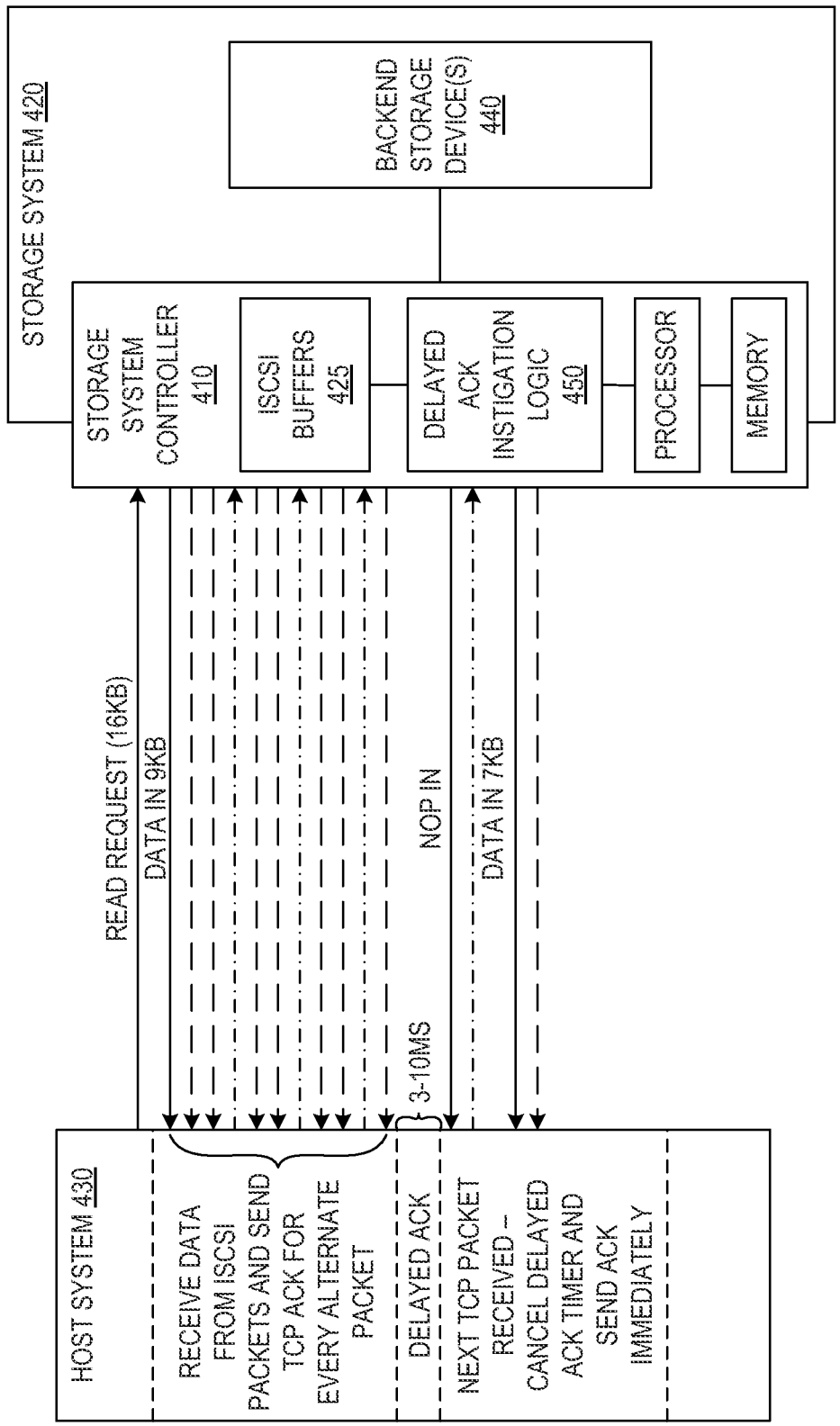
FIG. 4 is an example block diagram illustrating the primary operational logic and the exchange of communications between a storage controller and a target host system in accordance with one illustrative embodiment.

FIG. 4 is an example block diagram illustrating the primary operational logic and the exchange of communications between a storage controller and a target host system in accordance with one illustrative embodiment. In comparing FIG. 3 and FIG. 4, it can be seen that one of the primary differences between the configurations is that the storage system controller 410 comprises delayed ACK instigation logic 450. The delayed ACK instigation logic 450 operates to avoid the large period of inactivity 350 in FIG. 3 by determining when to send an ACK instigation data packet, which may be a NOP IN TCP data packet for example, to cause the host system 430 to transmit an ACK response when it otherwise would not.

For example, the delayed ACK instigation logic 450 determines if there are no additional TCP data packet transfers pending for an iSCSI connection between the storage system controller 410 and the host system 430 of an iSCSI connection, and further determines if there are pending requests waiting for an ACK from the host system 430. If so, then the delayed ACK instigation logic 450 may transmit an ACK instigation data packet, such as the NOP IN TCP data packet, to cause the host system 430 to transmit an ACK of the previously received TCP data packet received by the host system 430. This transmission of the ACK instigation data packet may be performed after waiting a predetermined timeout period that is significantly smaller than the timeout period set for the delayed ACK optimization in the host system 430, e.g., approximately 3-5 ms.

Thus, in the particular depicted example embodiment of FIG. 4, the host system 430 sends a read request to the storage system controller 410 requesting 16 KB of data from the backend storage devices 440. The requested data may then be placed into the iSCSI buffers 425 of the storage system controller 410 which uses the sendpages( ) TCP interface to send 9 KB iSCSI data packets to the host system 430 via an iSCSI network connection with the host system 430. 9 KB iSCSI data packets translates to 7 TCP/IP data packets that are actually transmitted from the storage controller 410 to the host system 430. The host system 430 is configured to receive these iSCSI packets and send a TCP ACK data packet for every alternate data packet.

At some point during the transfer of data, a single TCP packet is sent from the storage system controller 410 to the host system 430 since a last TCP ACK was transmitted by the host system 430 to the storage system controller 410. In such a case, the host system 430 waits for the next TCP data packet from the storage system controller 410 which is itself waiting for a TCP ACK response from the host system 430. In the embodiment depicted in FIG. 3, this results in a period of inactivity 350 in which no data packets are exchanged between the storage system controller 310 and the host system 330.

With the embodiment shown in FIG. 4, the delayed ACK instigation logic 450 monitors the iSCSI buffers 425. If the delayed ACK instigation logic 450 determines that there are no additional iSCSI data transfers pending for the iSCSI connection by monitoring the iSCSI buffers 425 and determining that the data in the iSCSI buffers 425 have already been transmitted, and further determines that there are existing transfers for which the storage system controller 410 is waiting for an ACK from the host system 430, then the delayed ACK instigation logic 450 determines that a delayed ACK instigation data packet needs to be transmitted to the host system. These determinations can be made based on iSCSI control blocks stored in a pending queue data structure (not shown). That is, each iSCSI transfer is tracked using control blocks which, after sending the iSCSI data packet(s), are queued in a pending queue where it waits for a corresponding TCP ACK response from the target host system. The pending queue is maintained on a per iSCSI connection basis and hence, if that pending queue is not empty, then there are transfers waiting for an ACK from the target host system which associated with the iSCSI connection. Thus, the delayed ACK instigation logic 450 may determine if there are outstanding iSCIS data transfers pending that are awaiting an ACK response by determining if the corresponding pending queue of the iSCSI connection is empty or not.

The delayed ACK instigation logic 450 may wait a predetermined time period before sending the delayed ACK instigation data packet, such as approximately 1 to 10 ms, or the like. The predetermined time period may be a fixed value or may be tuned to the determined link latency or TCP socket round trip time (RTT), for example. The RTT for a TCP socket connection can be queried from the TCP socket structure (available in the kernel socket structure or calculated by the target driver based on historic I/O response times). For example, the predetermined time period may be calculated based on the time elapsed between the last transfer and the current time. If this time elapsed value is a fixed multiple of the RTT for that socket, an ACK instigation data packet may be sent assuming that the host is delaying the ACK response because of the delayed ACK optimization of the host system. As a result, the mechanisms of the illustrative embodiments may adjust themselves to the RTT of different network connections.

If an ACK response has not been received by the storage system controller 410 within that predetermined time period, then the delayed ACK instigation data packet is transmitted by the storage system controller 410. In one illustrative embodiment, this delayed ACK instigation data packet may be a NOP IN request that is sent to the host system 430.

In response to receiving the delayed ACK instigation data packet, the host system 430 sends the TCP ACK for the previously received data transfer over the iSCSI connection because it has now received the next TCP packet that it was waiting for in the form of the NOP IN request. The storage system controller 410 then completes the previous data transfer and continues with the next data transfer reusing the iSCSI buffer 425. This operation may be repeated for each iSCSI connection between the storage system controller 410 and the host system 430.

The delayed ACK instigation logic 450 may be implemented in software, hardware, or any combination of software and hardware. In one illustrative embodiment, the delayed ACK instigation logic 450 is implemented as software instructions loaded into a memory of the storage system controller 410 and executed by one or more processors of the storage system controller 410. In other illustrative embodiments, the delayed ACK instigation logic 450 may be implemented as hardware logic elements.

Figure 5:
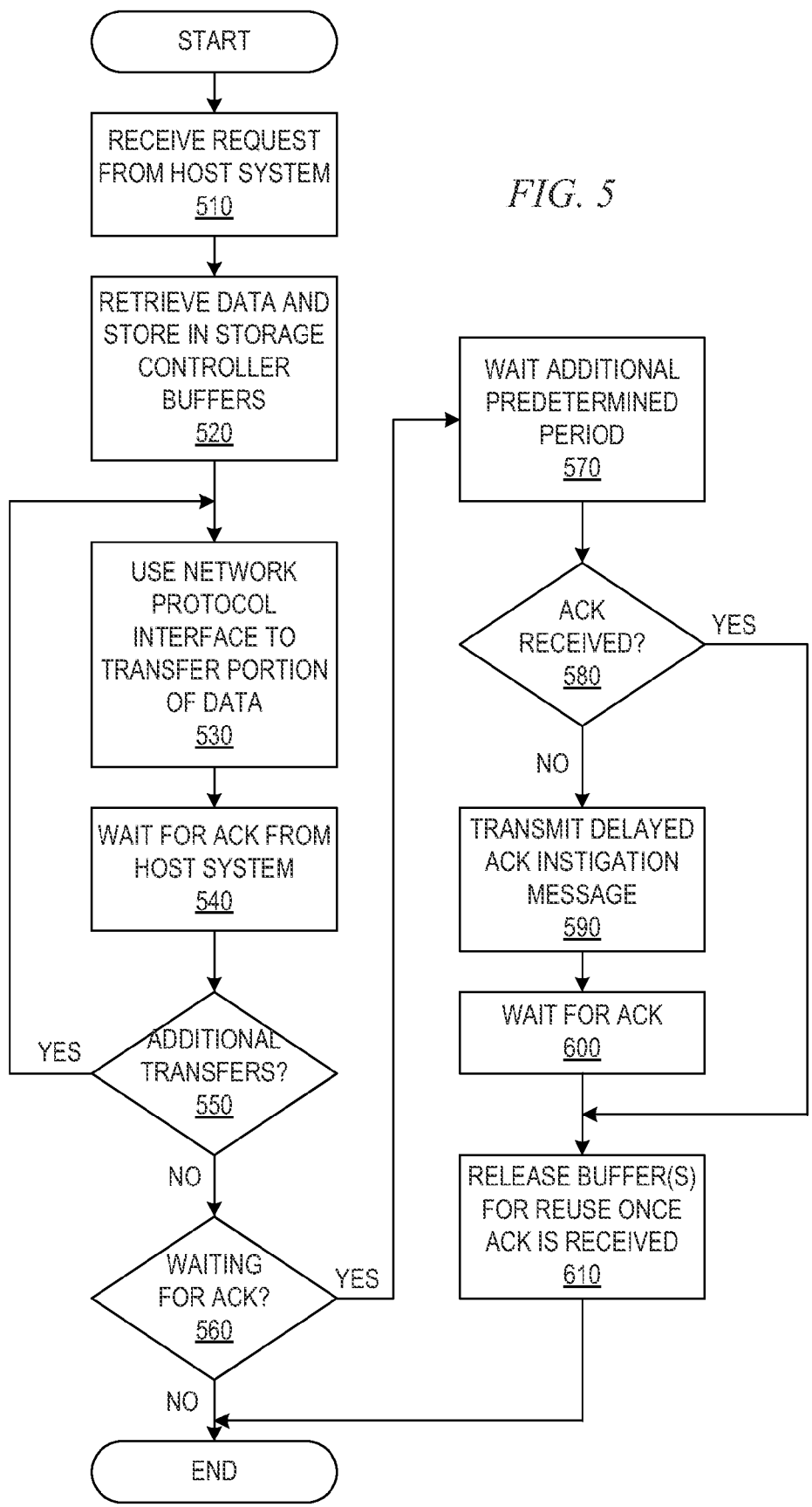
FIG. 5 is a flowchart outlining an example operation of a storage system controller implementing delayed ACK instigation logic in accordance with one illustrative embodiment.

FIG. 5 is a flowchart outlining an example operation of a storage system controller implementing delayed ACK instigation logic in accordance with one illustrative embodiment. As shown in FIG. 5, the operation starts with receiving a request for a data transfer from a remotely located host system (step 510). The storage system controller retrieves the requested data from the backend storage devices and stores the data into buffers of the storage system controller (step 520). The storage system controller uses a network protocol interface to transmit a portion of the data to the requesting host system (step 530) and waits for an ACK to be returned from the host system (step 540). A determination is made as to whether there is any additional data packet transfers pending for the connection with the host system (step 550). If so, then the operation returns to step 530. If not, then a determination is made as to whether there are any outstanding data packet transfers that have not yet been acknowledged by the host system (step 560). If not, then the operation terminates.

If there are no additional pending data transfers (step 550) and there are outstanding data packet transfers for which an ACK has not yet been received (step 560), the storage system controller waits an additional predetermined period of time, which may be fixed or may be set according to determined connection latency or RTT (step 570). A determination is made as to whether an ACK is received over the connection within the predetermined period of time (step 580). If so, then the operation branches to step 610. If the ACK is not received within the predetermined period of time, then the storage system controller transmits a delayed ACK instigation message to the host system (step 590) to thereby trigger the host system's sending of a ACK response to the previously transmitted data packets, and waits for the ACK to be returned (step 600). In response to receiving the ACK response from the host system, the storage system controller buffers are released for reuse with a next data transfer (step 610). The operation then terminates.

Thus, with the mechanisms of the illustrative embodiments, the delayed ACK optimization of a network protocol may be kept enabled while avoiding the drawbacks associated with delays incurred by the use of this optimization. Moreover, the benefits derived from a zero copy TCP transfers are able to be maintained while avoiding the drawbacks of the delayed ACK optimization. Furthermore, the iSCSI protocol may be implemented in software while obtaining the benefits of the present invention, thereby avoiding the need to utilize more costly hardware implemented iSCSI/TCP offload engines.

It should be noted that the illustrative embodiments can be used with any particular protocol that permits the use of a delayed ACK operation or its equivalent. Furthermore, the illustrative embodiments may operate with any type of storage system protocol. Thus, while the illustrative embodiments are described herein in terms of the TCP/IP network protocol stack and the iSCSI storage system protocol, they are not limited to such. Hence, the use of iSCSI and TCP/IP in the present description should not be construed as limiting on possible embodiments of the present invention and other protocols can be used without departing from the spirit and scope of the illustrative embodiments.

It should also be noted that while the above illustrative embodiments are directed to a system utilizing a TCP delayed ACK optimization that utilizes a predetermined number of data packets as a basis for determining when to transmit an ACK response data packet, the illustrative embodiments are not limited to such. To the contrary, some operating systems may utilize a different implementation of a TCP delayed ACK which does not send the ACK response data packet after every predetermined number of data packets, e.g., after every two data packets are received at the host system. For example, in some implementations of the AIX operating system available from International Business Machines Corporation or Armonk, N.Y., the determination as to when to transmit an ACK response data packet is made based on a number of bytes received rather than a number of TCP data packets received.

In such a case, the delayed ACK instigation logic may operate to transmit an ACK instigation data packet, e.g. a NOP IN data packet, after a predetermined period of time has elapsed since the transmission of the data packet for which an ACK is outstanding. The ACK instigation data packet may itself request a particular response data packet to be transmitted from the host system back to the storage system controller. This causes the host system to respond with the requested response data packet which can piggyback on the ACK data packet thereby causing the host system to generate and transmit the ACK data packet so that the response data packet may be piggybacked on the ACK data packet. As a result, the ACK is received at the storage system controller allowing the storage system controller's buffer to be released for reuse.

For example, in response to a host system sending an iSCSI Read command to the storage system controller, the storage system controller retrieves the data from the backend storage devices, transmits it directly from the iSCSI buffer via a TCP/IP network connection to the host system and awaits an ACK response data packet. Assuming that the host system is utilizing the delayed ACK optimization, the ACK response data packet will be delayed for some time. If the delay lasts for a predetermined amount of time such that an ACK response is not received by the storage system controller within a predetermined period of time, the delayed ACK instigation logic may operate to send to the host system a NOP IN data packet with a setting to request that a NOP OUT response be returned by the host system. As a result of receiving this NOP IN data packet the host system will generate a NOP OUT data packet for transmission to the storage system controller which can then be piggybacked on an ACK response data packet. Thus, the host system sends out the ACK response data packet with the NOP OUT data packet piggybacking on the ACK response data packet. As a result, the storage system controller receives the ACK it has been waiting for and can reuse the iSCSI buffer used to perform the previous transmission.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a storage system, for instigating the sending of an acknowledgement response from a host system, comprising:

responsive to a storage system controller of a storage system receiving a read request from the host system, storing, by a storage system controller of the storage system, requested data in a buffer of the storage system controller, wherein the host system is configured to use a delayed acknowledgement optimization of a network protocol such that the host system sends an acknowledgement response after receiving a predetermined number of data transfers, wherein the predetermined number is greater than one;

initiating, by the storage system controller, sending data transfers from the buffer to the host system via a network connection with the host system;

monitoring, by the storage system controller, the buffer of the storage system controller to determine if there is a data transfer pending in the buffer;

in response to a determination that there is no data transfer pending in the buffer, determining, by the storage system controller, whether the is an outstanding data transfer, on the network connection with the host system, for which an acknowledgement response has not been received from the host system; and in response to a determination that there is an outstanding data transfer for which an acknowledgement response has not been received, sending, by the storage system controller, an acknowledgement instigation message to the host system to instigate the host system sending an acknowledgement response for the outstanding data transfer, wherein receipt of the acknowledgement instigation message by the host system causes a transmission of the delayed acknowledgement to be triggered on the host system, wherein the buffer is an Internet Small Computer System Interface (iSCSI) buffer, and wherein the storage system controller transmits data packets directly from the iSCSI buffer over the network connection to the host system without copying the data packets from the iSCSI buffer to a network protocol buffer.

2. The method of claim 1, wherein the outstanding data transfer is a data transmission from the data processing system to the host system using a sendpage( ) interface of a transmission control protocol (TCP).

3. The method of claim 1, wherein the acknowledgement instigation message is a NOP IN message.

4. The method of claim 3, wherein the NOP IN message requests a NOP OUT response from the host system, thereby causing the host system to transmit a NOP OUT data packet piggybacked on a delayed acknowledgement response data packet to the data processing system.

5. The method of claim 1, wherein a network protocol of the network connection is a TCP/IP network protocol, and wherein the data packets are sent directly from the iSCSI buffer using a sendpage( ) interface of the TCP/IP network protocol.

6. The method of claim 1, wherein sending an acknowledgement instigation message to the host system to instigate the host system sending an acknowledgement response for the outstanding data transfer comprises waiting a predetermined amount of time, from a time at which the outstanding data transfer was made, before sending the acknowledgement instigation message to the host system.

7. The method of claim 6, wherein the predetermined amount of time is dynamically determined based on a characteristic of the network connection between the host system and the storage system.

8. The method of claim 7, wherein the characteristic is a Round Trip Time (RTT) of the network connection, and wherein the acknowledgement instigation message is sent in response to an elapsed time, since the outstanding data transfer was made, being a fixed multiple of the RTT of the network connection.

9. The method of claim 1, wherein the method is implemented as software instructions executed by at least one processor of the storage system controller.

10. A computer program product comprising a non-transitory computer readable storage device having a computer readable program stored therein, wherein the computer readable program, when executed on a storage system controller of a storage system, causes the storage system controller to:

store, responsive to the storage system controller receiving a read request from the host system, requested data in a buffer of the storage system controller, wherein the host system is configured to use a delayed acknowledgement optimization of a network protocol such that the host system sends an acknowledgement response after receiving a predetermined number of data transfers, wherein the predetermined number is greater than one;

initiate sending data transfers from the buffer to the host system via a network connection with the host system;

monitor the buffer of the storage system controller to determine if there is a data transfer pending in the buffer;

determine, in response to a determination that there is no data transfer pending in the buffer, whether there is an outstanding data transfer, on the network connection with the host system, for which an acknowledgement response has not been received from the host system; and send, in response to a determination that there is an outstanding data transfer for which an acknowledgement response has not been received, an acknowledgement instigation message to the host system to instigate the host system sending an acknowledgement response for the outstanding data transfer, wherein receipt of the acknowledgement instigation message by the host system causes a transmission of the delayed acknowledgement to be triggered on the host system wherein the buffer is an Internet Small Computer System Interface (iSCSI) buffer, and wherein the storage system controller transmits data packets directly from the iSCSI buffer over the network connection to the host system without copying the data packets from the iSCSI buffer to a network protocol buffer.

11. The computer program product of claim 10, wherein the outstanding data transfer is a data transmission from the data processing system to the host system using a sendpage( )interface of a transmission control protocol (TCP).

12. The computer program product of claim 10, wherein the acknowledgement instigation message is a NOP IN message.

13. The computer program product of claim 12, wherein the NOP IN message requests a NOP OUT response from the host system, thereby causing the host system to transmit a NOP OUT data packet piggybacked on a delayed acknowledgement response data packet to the data processing system.

14. The computer program product of claim 10, wherein a network protocol of the network connection is a TCP/IP network protocol, and wherein the data packets are sent directly from the iSCSI buffer using a sendpage( )interface of the TCP/IP network protocol.

15. The computer program product of claim 10, wherein sending an acknowledgement instigation message to the host system to instigate the host system sending an acknowledgement response for the outstanding data transfer comprises waiting a predetermined amount of time, from a time at which the outstanding data transfer was made, before sending the acknowledgement instigation message to the host system.

16. The computer program product of claim 15, wherein the predetermined amount of time is dynamically determined based on a characteristic of the network connection between the host system and the storage system.

17. The computer program product of claim 16, wherein the characteristic is a Round Trip Time (RTT) of the network connection, and wherein the acknowledgement instigation message is sent in response to an elapsed time, since the outstanding data transfer was made, being a fixed multiple of the RTT of the network connection.

18. The computer program product of claim 10, wherein the method is implemented as software instructions executed by at least one processor of the storage system controller.

19. A storage system controller, comprising:

a processor; and a memory coupled to the processor, wherein the memory comprises instructions which, when executed by the processor, cause the processor to store, responsive to the storage system controller receiving a read request from the host system, requested data in a buffer of the storage system controller, wherein the host system is configured to use a delayed acknowledgement optimization of a network protocol such that the host system sends an acknowledgement response after receiving a predetermined number of data transfers, wherein the predetermined number is greater than one;

initiate sending data transfers from the buffer to the host system via a network connection with the host system;

monitor the buffer of the storage system controller to determine if there is a data transfer pending in the buffer;

determine, in response to a determination that there is no data transfer pending in the buffer, whether there is an outstanding data transfer, on the network connection with the host system, for which an acknowledgement response has not been received from the host system; and send, in response to a determination that there is an outstanding data transfer for which an acknowledgement response has not been received, an acknowledgement instigation message to the host system to instigate the host system sending an acknowledgement response for the outstanding data transfer, wherein receipt of the acknowledgement instigation message by the host system causes a transmission of the delayed acknowledgement to be triggered on the host system, wherein the buffer is an Internet Small Computer System Interface (iSCSI) buffer, and wherein the storage system controller transmits data packets directly from the iSCSI buffer over the network connection to the host system without copying the data packets from the iSCSI buffer to a network protocol buffer.

* * * * *